Dec. 23, 1958  G. A. LYON  2,865,680
WHEEL COVER
Filed March 5, 1956  3 Sheets-Sheet 1
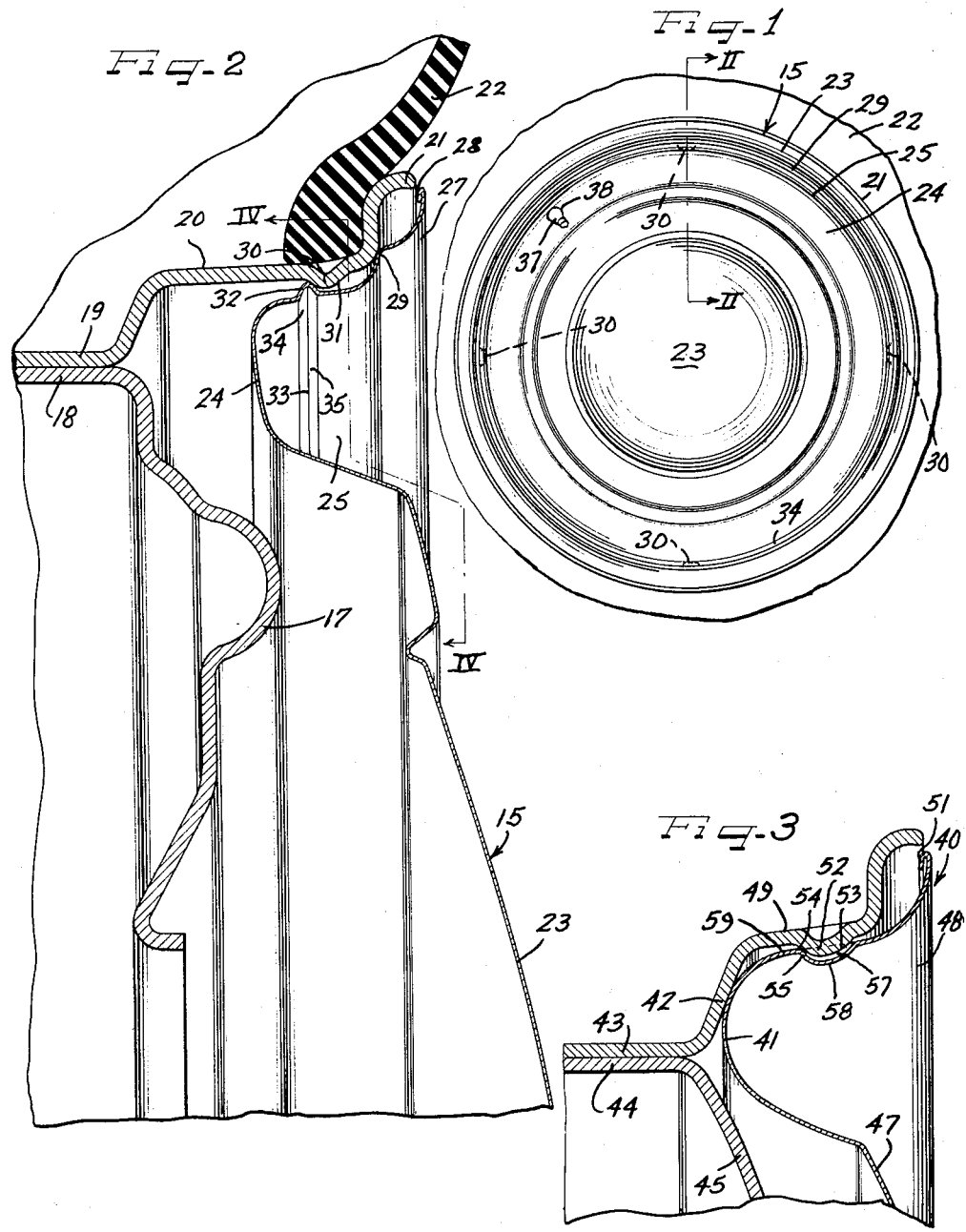
Inventor
GEORGE ALBERT LYON Inventor
GEORGE ALBERT LYON Dec. 23, 1958
G. A. LYON
2,865,680
WHEEL COVER
Filed March 5, 1956
3 Sheets-Sheet 3
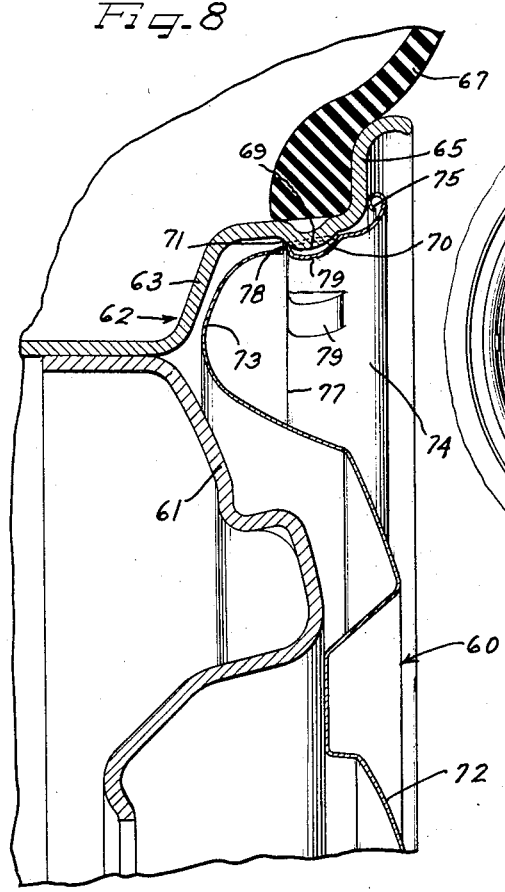
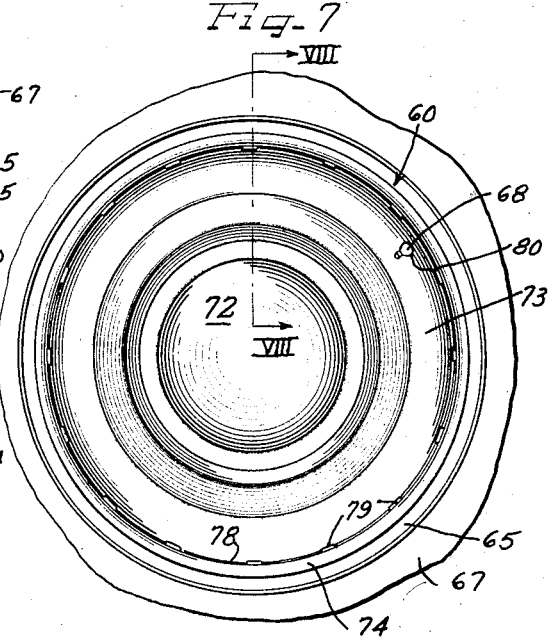
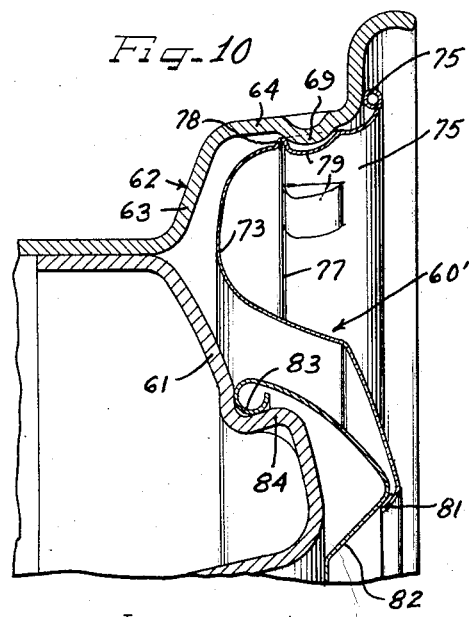
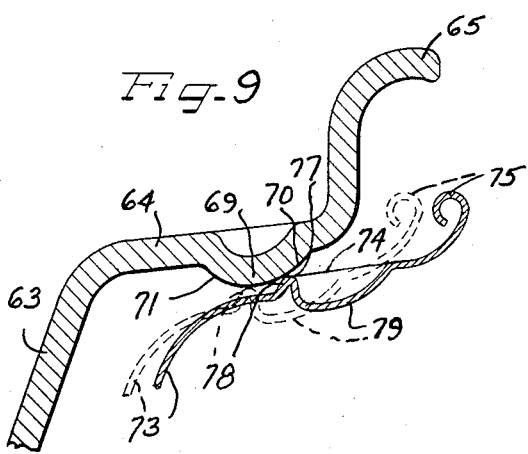
Inventor
GEORGE ALBERT LYON

United States Patent Office 2,865,680
Patented Dec. 23, 1958

2,865,680

WHEEL COVER

George Albert Lyon, Detroit, Mich.

Application March 5, 1956, Serial No. 569,610

20 Claims. (Cl. 301—37)

This invention relates to wheel structures and more particularly to the ornamental and protective covering of the outer sides of vehicle wheels with either full disk or annular trim ring types of cover having novel means for retaining the cover on the wheel.

For reducing costs, it is desirable to manufacture wheel covers from as small a blank as practicable and with a minimum number of die operations.

An important object of the present invention is to attain both of these desirable ends and at the same time provide improved cover retaining means.

Another object of the invention is to provide improved means for retaining wheel covers on vehicle wheels provided with retaining protuberances or bumps, wherein the covers have resilient shoulder structure formed directly on body portions of the cover for retaining press-on, pry-off engagement with the protuberances.

A further object of the invention is to provide novel protuberance receiving pocket and shoulder structure in sheet metal vehicle wheel covers, with additional protuberance engageable turn-preventing shoulder structure on the cover.

Still another object of the invention is to provide a wheel cover with improved wheel gripping means which also serves to prevent rotation of the cover relative to the wheel.

A still further object of the invention is to provide a cover with a resilient annular shoulder common to a plurality of bump receiving sockets in the cover for controlling the entry of the wheel bumps or protuberances into the sockets or indentations.

It is also an object of the invention to provide a highly simple, unitary sheet metal cover, having retaining means and which lends itself to economical manufacture on a large production basis.

Other objects, features and advantages of the present invention will be readily apparent from the following detailed description of certain preferred embodiments thereof taken in conjunction with the accompanying drawings in which:

Figure 1 is an outer side elevational view of a vehicle wheel structure embodying features of the invention;

Figure 2 is an enlarged fragmentary radial sectional detail view taken substantially on the line II—II of Figure 1;

Figure 3 is a fragmentary sectional detail view similar to Figure 2 but showing a modification;

Figure 7 is an outer side elevational view of a wheel structure showing a further, modified form of the invention;

Figure 8 is a fragmentary radial sectional detail view taken substantially on the line VIII—VIII of Figure 7;

Figure 4:
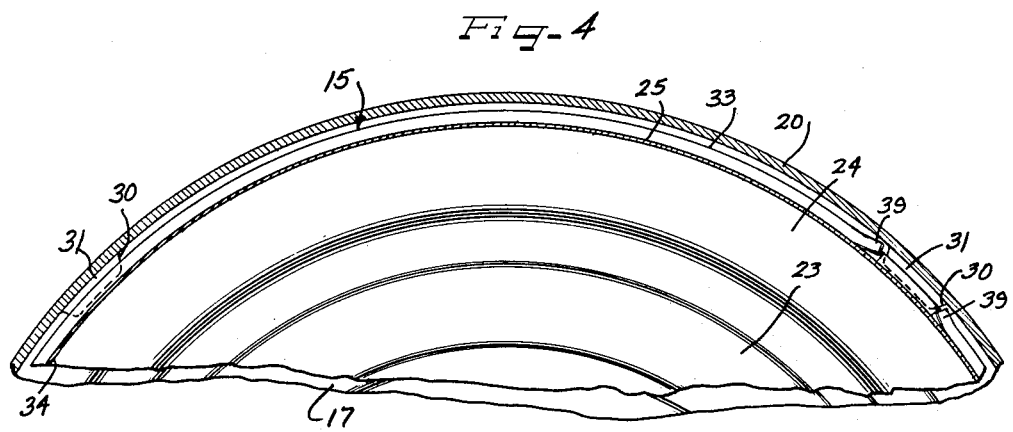
Figure 4 is a fragmentary sectional elevational detail view taken substantially on the line IV—IV of Figure 2 but showing the cover before it is pressed home on the wheel.

Figure 9 is an enlarged fragmentary sectional detail view similar to Figure 8 but showing the cover in the process of being pressed over one of the bumps or protuberances on the wheel; and Figure 10 is a fragmentary radial sectional view similar to Figure 8 but showing a further modification of the invention wherein the cover is in the form of a trim ring or member cooperable with a central hub cap.

Referring to Figures 1 and 2, a wheel cover 15 embodying features of the invention is constructed and arranged for disposition over the outer side of a vehicle wheel such as an automobile wheel including a central disk spider body part 17 provided on its outer margin with an axially inwardly extending attachment flange 18 secured in suitable manner to a base flange 19 of a multi-flange tire rim provided with an intermediate generally axially outwardly directed and radially inwardly facing annular flange 20 which merges with a generally radially outwardly and then axially outwardly extending terminal flange 21. The tire rim is adapted to support a pneumatic tire 22 such as a tubeless tire.

As shown, the cover 15 is of the full disk type and of a diameter to substantially cover the entire outer side of the wheel including the wheel body 17 and the tire rim. On the other hand, the cover could be a trim ring annulus cooperative with a central hub cap. In any event, the cover 15 is preferably made from suitable grade of thin sheet metal such as stainless steel plate or strip, brass, aluminum, or the like, having the requisite cold working characteristics and finish characteristics.

Herein the cover 15 includes a central crown portion 23 for overlying the wheel body 17 and merging with an intermediate annular inwardly dished portion 24 which is preferably of generally curved cross-section although if desired a central portion of the cross-section may be substantially flat. It will be observed that the dished intermediate portion 24 is dimensioned to extend generally axially inwardly into the annular groove defined between the tire rim and more particularly the intermediate flange 20 thereof and the wheel body, and over the juncture between the tire rim and the wheel body. Thereby, a generally axially outwardly extending outer annular marginal cover portion 25 with which the intermediate portion 24 merges on a radius is adapted to fit in assembly with the wheel in generally telescoped somewhat spaced relation to the axially outer portion of the intermediate flange 20 of the tire rim. At its outer extremity the marginal portion 25 of the cover extends generally axially and radially outwardly into overlying relation to the terminal flange 21 and provides an annular reinforcing rib 27 of substantial radius adapted to define therebehind with the terminal flange 21 of the tire rim a chamber within which wheel balancing weights are adapted to be accommodated. An underturned reinforcing and finishing lip flange 28 is provided at the extremity of the cover portion 27.

Intermediate the generally axially extending portion 25 and the generally radially extending portion 27, which thus extend about the juncture of the intermediate and terminal flanges of the tire rim, is provided an annular generally axially inwardly indented shoulder 29 for seating upon the juncture shoulder between the intermediate and terminal rim flanges for thereby determining the axially inward disposition of the cover in full assembly upon the wheel.

By virtue of the cross-sectional structure of the marginal cover portions 25 and 27, they are adequately form sustaining and resistant to deformation in handling and in service, but nevertheless are resiliently deflectable in response to substantial pressures applied thereagainst, and more particularly locally applied pressures. This factor is of advantage in adapting the generally axially extending annular marginal cover portion 25 for snap-on, pry-off retaining engagement with a series of generally radially inwardly extending cover retaining projections or bumps 30 provided on the axially outer portion of the intermediate rim flange 20. There may be three or four of the bumps 30, in the present instance shown as four being herein shown equidistantly circumferentially spaced. Each of the bumps 30 has a lead-in cam surface 31 on its axially outer side sloping generally radially and axially inwardly to the radially innermost extremity or nose of the bump and there merging on a radius with a generally undercut radially outwardly and axially inwardly sloping and generally radially and axially inwardly facing cover retaining shoulder 32.

For retaining interengagement with the retaining bumps 30, the generally axially extending cover portion 25 is provided adjacent juncture with the intermediate cover portion 24 with an annular rib or shoulder 33 projecting generally radially outwardly. The periphery of this shoulder is normally in a circle of a diameter slightly greater than the diameter of a circle common to the innermost surfaces or noses of the bumps 30. As a consequence, in order for the shoulder 33 to pass over the bumps (Figs. 4, 5 and 6) in the application of the cover to the wheel, the shoulder must yield resiliently. This is made possible by the resilient characteristics of the material of the metal cover, in addition to the construction and arrangement and location of the shoulder 33 in relation to the bumps 30.

Figure 5:
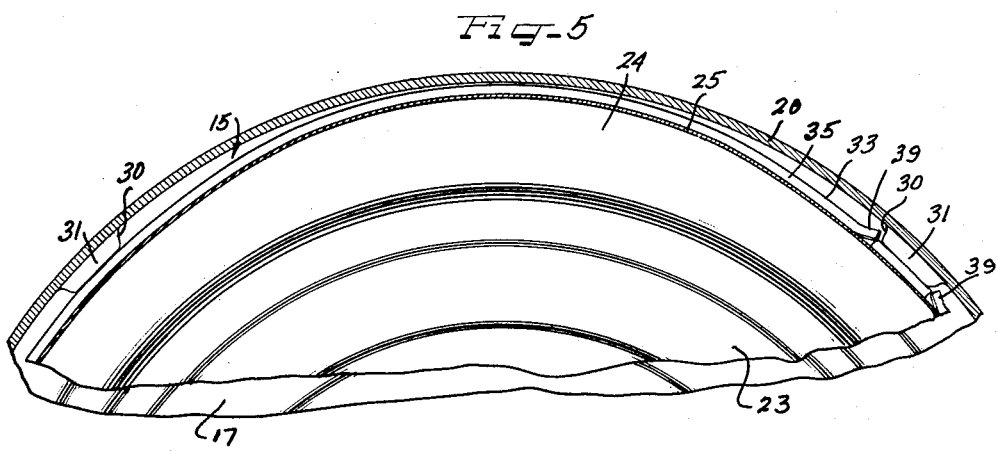
Figure 5 is the same as Figure 4 but showing the relationship attained between the cover and the wheel as the retaining shoulder rib passes the maximum projections or noses of the retaining protuberances or bumps.
Figure 6:
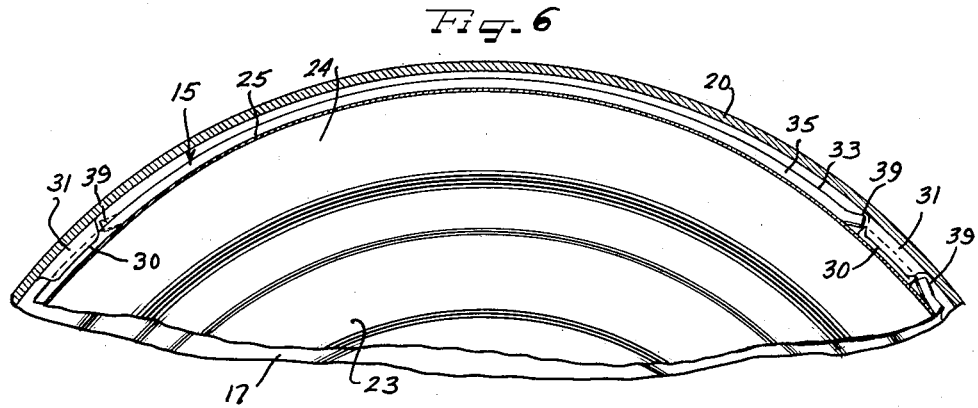
Figure 6 is the same as Figures 4 and 5 but shows the relationship attained when the cover is fully retained on the wheel by the inter-engagement of the retaining shoulder rib structure thereof and the retaining protuberances on the wheel, and more particularly in the relationship shown in Figure 2.

The normal circumference of the rib shoulder 33 is preferably circular as best seen in Figure 4. This means that in order to pass axially inwardly over and behind the retaining bumps 30, or at least certain of them, the shoulder 33 must yield or deflect radially inwardly (Fig. 5). Then the shoulder 33 must resiliently expand after it has passed the bumps so as to engage behind the retaining shoulders 32 of the bumps (Fig. 6). It is highly important that such flexure of the shoulder 33 be accomplished without any permanent deformation or setting of the material in or adjacent to the shoulder 33 of the cover. In other words, to accomplish this desirable result, it is necessary for the shoulder and the adjacent portions of the cover to be possessed of substantial resilient deflectability, but the resilience must be of sufficient resistance or stiffness to assure a sufficiently strong resilient, tensioned grip upon the retaining bump shoulders 32 to assure retention of the cover under all service conditions to which it and the wheel may be subjected, but nevertheless enabling convenient pry-off when it is desired to remove the cover from the wheel.

To the attainment of the resilient deflectability and strong bump retaining gripping function of the retaining shoulder 33 of the cover, it is constructed of primarily an annular narrow generally radially and axially outwardly oblique flange 34 extending angularly relative to the intermediate portion 24 and the axially extending marginal portion 25 of the cover and joined thereto on a short radius annular juncture. In addition, the shoulder flange 34 serves as an offsetting flange between the juncture portion of the intermediate cover portion 24 and the axially extending marginal portion 25 of the cover. That is, the marginal portion 25 is radially outwardly offset relative to the juncture of the shoulder flange 34 and the radially outer turned part of the cover portion 24.

In order to accommodate the retaining bumps 30 at the axially outer side of the retaining shoulder 33, a return bent shoulder flange 35 is provided as an annular juncture of the retaining shoulder with the radially outer marginal cover portion 25. It will be observed that the shoulder flanges 34 and 35 are in substantially divergent relation, with the axially inner, offsetting flange 34 somewhat wider than the axially outer return bent juncture flange 35. Moreover, the flanges 34 and 35 provide therebetween a radially inwardly opening groove of substantial width. Such groove is easy to keep clean.

Actually, the width of the return bent axially outer juncture flange 35 is just ample to accommodate the retaining bumps 30 without engagement thereof with the axial cover portion 25 when the shoulder 33 is in full retaining gripping camming tensioned engagement with the bump shoulders 32 as best seen in Figures 2 and 6.

Tensioned, camming engagement of the shoulder 33 with the bump shoulders 32 is assured by the limit upon axially inward disposition of the cover effected by seating or bottoming of the cover shoulder 29 against the tire rim shoulder engaged thereby. In other words, the axial spacing between the retaining shoulder 33 and the seating or bottoming shoulder 29 is slightly less than the axial spacing or distance between the point on the tire rim shoulder against which the seating shoulder 29 engages and the axially innermost or juncture ends of the bump shoulders 32. Thereby, seating of the shoulder 29 against the tire rim acts as a restraint upon camming of the shoulder 33 entirely to the bottom of the cam faces provided by the bump shoulders 32. This assures that the shoulder 33 will engage the bump shoulders 32 with a strong tension grip due to the recovery factor in the retaining shoulder 33 acting to return the shoulder 33 to its normal circularity from which the shoulder 33 has been deflected as an incident to engagement with the retaining bumps 30.

When applying the cover 15 to the outer side of the wheel, a valve stem 37 projecting from or carried by the tire rim is registered through a valve stem aperture 38 in the dished intermediate portion 24 of the cover. As an incident to such registration with the valve stem 37, the retaining shoulder 33 may be inserted by lateral approach behind the retaining bumps 30 adjacent thereto. Then by application of axially inward pressure against the diametrically opposite side of the cover, the retaining shoulder 33 is snapped over and behind the remaining retaining bumps 30.

For graphic purposes, the cover 15 is shown in Fig. 4 as disposed perfectly concentrically relative to the wheel so that the smaller diameter retaining shoulder 33 is disposed in uniformly spaced relation to the adjacent portion of the intermediate flange 20 of the tire rim, and resting upon the lead-in cam surfaces 31 of the retaining bumps 30. It will be observed that in such relationship the shoulder 33 overlaps a substantial portion of the projections or bumps 30. This may amount to about the radially innermost half of the bumps as indicated in dash outline in Fig. 4 behind the overlying shoulder 33. Of course, if the shoulder 33 at the diametrically opposite side of the cover has already been inserted behind the bumps 30, such overlap of the shoulder 30 relative to the axially outer sides of the bumps 30 may be substantially less, since thereby the cover will be somewhat eccentrically related to the wheel prior to pressing the cover home into fully retained relation upon the wheel.

As the cover responds to axially inward pressure, and more particularly such pressure applied thereto in the vicinity of the retaining bumps 30 over which the shoulder 33 must be worked to attain the cover-retaining relation to the bumps, the shoulder 33 responds in a live, resilient, elastically yieldable fashion to deflect radially inwardly as it cams down the lead-in surfaces 31 of the bumps until, as visualized in Fig. 5, the shoulder reaches the tips of the noses of the bumps 30 and thus the maximum resilient radially inward deflection. This is accomplished without setting or permanent deformation of the bump-engaging portions of the rib 33 because of the open divergence of the shoulder flanges 34 and 35 taken together with the inherent resilience of the cover marginal portions 25 and 27 as well as the turned radially outer juncture portion of the intermediate cover portion 24. The construction is such that not only do these contiguous and adjacent portions of the cover yield advantageously resiliently generally radially inwardly with the bump-engaging portions of the shoulder 33, but in order to compensate for such radially inward yielding to a smaller diameter and to relieve the radially inwardly tensioned and deflected portions from deforming stress or strain, also resiliently deflectably, elastically yield and shift radially outwardly, symmetrically intermediate the bumps 30, substantially as shown in Fig. 5. This resilient compensatory yielding deflection out of round of the shoulder 33 and associated portions of the cover, alternately radially inwardly and radially outwardly may be summarized as a generally clover-leafing action. As a result of this clover-leafing action, not only are those portions of the retaining shoulder 33 in engagement with the retaining bumps 31 caused to attain a substantially loaded-spring tensioned condition that develops a substantial radially outward thrust against the bumps 30, but the portions of the shoulder 33 and associated portions of the cover intermediate the bumps are spring loaded on the order of a taut bow tending to return radially inwardly toward the normal circularity of the shoulder 33 and thus reacting toward the bump-engaging portions of the shoulder 33 to enhance the radially outward bump-gripping thrust of such bump-engaging portions. This mutuality of resilient or elastic reaction entirely about the cover shoulder 33 assures that the shoulder will substantially equally grip each of the several retaining bumps 30.

Moreover, the efficiently tensioned retaining shoulder 33, and more particularly the bump-engaging portions thereof act instantaneously upon passing axially inwardly beyond the tips of the retaining bumps 30 to snap cammingly onto and grippingly against the retaining shoulders 32 of the respective bumps into the retained position shown in Fig. 6. Since the seating shoulder 29 of the cover precludes axially inward escape of the retaining shoulder 33 from gripping, camming interengagement with the bump shoulders 32, the clover-leafing tensioning deflection of the retaining shoulder 33 is maintained to a small extent, as visualized in Fig. 6. This assures firm gripping of the shoulder 33 against the bump shoulders 32 and tight drawing of the seating shoulder 29 against the tire rim. Such maintenance of gripping tension in the shoulder 33 also positively assures centering of the cover relative to the wheel, since the tensioned thrust of the shoulder 33 is mutually symmetrical and self-adjusting with respect to all of the retaining bumps.

In the fully assembled relationship of the cover 15 upon the wheel, the radially outwardly opening groove defined axially outwardly from the shoulder flange 35 by the cover portion 25 affords a recess within which the retaining bumps 30 are freely accommodated except, of course, for the retaining engagement of the bumps by the shoulder 33 at the axially inner side of the pocket.

In order to hold the cover 15 against turning relative to the wheel, so as to prevent distortion of the valve stem 37, turn-preventing means are preferably provided within the pocket defined by the annular cover portion 25 for engagement with the side or sides of one or more of the retaining bumps 30. Such turn-preventing means may comprise a pair of circumferentially spaced opposed shoulders 39 struck up from the return bent shoulder flange 35, as shown in Figs. 4–6. The turn-preventing shoulders 39 provide abrupt edges or shoulders and may be struck out as tangs or as abrupt press outs or embosses, with the shoulders spaced apart slightly more than the width of one of the bumps 30 so as freely to receive the bump therebetween. Yet, upon any tendency of the cover 15 to turn on the wheel in either direction, one of the anti-turn shoulder projections 39, engages with the adjacent opposing side of the associated retaining bump 30 to hold the cover against turning. If in any instance it is considered more expedient or structurally more feasible to have instead of a pair of the anti-turn projection shoulders 39 for association with a single bump, a pair of the anti-turn shoulder projections so disposed as to be engageable with separate ones of the retaining bumps 30, one of the anti-turn projection shoulders 39 may be disposed as shown in dash outline at the left side of Fig. 6 and the anti-turn shoulder projection 39 at the right side of the bump at the right-hand side of Fig. 6 may be eliminated. In either event, of course, the turn-preventing shoulders 39 will be the same, one serving to prevent rotation of the cover in one rotary direction and the other serving to prevent turning of the cover in the opposite rotary direction.

Although the cover 15 has been shown as held in axially inward relation to the wheel by means of the seating shoulder 29 thereof, so that the intermediate portion 24 of the cover is spaced substantially axially outwardly from the tire rim and the wheel body, an arrangement substantially as shown in Fig. 3 is practicable if desired. That is, the intermediate portion 24 of the cover could be deepened so as to bottom against the wheel and thus serve as means for maintaining the retaining shoulder 33 of the cover in tensioned gripping relation to the retaining bump shoulders 32.

On the other hand, a cover 40 as depicted in Fig. 3 could be constructed to have an axially inwardly deeply dished intermediate annular portion 41 thereof spaced from the wheel similarly as in Fig. 2, instead of resiliently bottomed against a generally axially outwardly facing side flange 42 of a multiflange drop center tire rim supported through the medium of its base flange 43 attached to an attachment flange 44 of a disk spider wheel body 45. Radially inwardly from the intermediate portion 41, the cover 40 is provided with a central wheel body overlying crown portion 47, and a radially outer marginal portion 48 extending generally axially outwardly and then radially outwardly at the radially outer side of the intermediate dished portion 41 is arranged to overlie the tire rim including an intermediate generally axially outwardly extending and radially inwardly facing flange 49 and a terminal flange 50. At its radially outermost extremity, the radially outwardly turned portion of the cover margin 48 has an underturned reinforcing and finishing bead-like flange 51.

For retaining the cover 40 on the wheel, the intermediate flange 49 is provided in the axially outer portion thereof with generally radially inwardly extending projections or retaining bumps 52 which may be in any suitable number such as three or four and each provided with a lead-in cam surface 53 and a generally undercut radially and axially inwardly facing camming retaining shoulder 54.

Instead of continuous annular shoulder means such as the shoulder 33 of the cover 15 in Fig. 2, the cover 40 is provided with functionally similar shoulder means in the form of respective individual abrupt retaining shoulders 55 provided at the axially inner side of respective bump accommodating or clearing recesses or pockets 57 defined by generally radially inwardly embossed projections 58 in the generally axially extending portion of the radially outer marginal portion 48 of the cover and positioned generally radially inwardly of the outer marginal edge portion of the circular cover member. It will be understood, of course, that all of the generally axially outwardly facing retaining shoulders 55 are disposed in a common circle. There are at least as many of the recesses or sockets 57 and retaining shoulders 55 as there are retaining bumps 52.

In applying the cover 40 to the outer side of the wheel, a suitable valve stem aperture in the intermediate cover portion 41 (not shown but which will be similar to the valve stem aperture 38 in Fig. 1) will be registered with a valve stem carried by or projecting through the side flange 42 of the tire rim, and this will orient the shoulders 55 with the retaining bumps 52. Then axially inward pressure is applied to the cover to cam a lead-in cam surface 59 provided by that portion of the curved juncture between the intermediate and outer portions 41 and 48 of the cover axially inwardly adjacent the shoulders 55, against the lead-in cam surfaces 53 of the retaining bumps on the tire rim for resiliently radially inwardly deflecting the shoulders 55 and the adjacent portions of the cover marginal portion 48 similarly as depicted in Fig. 5 with respect to the cover 15, and with substantially the same clover-leafing action of the circular cover margin. After the retaining shoulders 55 have snapped in behind and into camming retaining gripping engagement with the bump shoulders 54, the intermediate cover portion 41 bottoming against the side flange 42 of the tire rim maintains a tensioned retaining grip of the shoulders 55 against the respective retaining bumps in substantially the same manner as the retaining shoulder 33 of the cover 15 as described in connection with Fig. 6. Thrust of the retaining shoulders 55 against the retaining bumps is enhanced by the thrusting strut-like coaction therewith of the lead-in cam portion 59 of the cover.

Turning of the cover 40 on the wheel is prevented by the turn-preventing shoulders afforded at the circumferentially opposite sides of the pockets or recesses 57 which are opposed to and thus retainingly engageable with the sides of the respective bumps 52 on any tendency of the cover to turn on the wheel in response to torque stresses or forces in service.

Removal of either the cover 15 or the cover 40 from the wheel may easily be effected by applying behind the outer marginal extremity portion of either of the covers a suitable pry-off tool and exerting pry-off leverage to cause the respective retaining shoulders on the covers to cam out of engagement with the respective retaining bumps. With respect to the cover 15, the pry-off tool, after being worked behind the extremity flange 28 is engageable behind the seating shoulder 29 serving then as a secondary pry-off shoulder. In prying off either of the covers, it is desirable to apply the pry-off tool generally in line with the bump nearest the application of pry-off force. The cover 40, of course, affords visual evidence of the location of the retaining bumps by virtue of the embossments 58. As to the cover 15, any suitable visual indicia may be supplied, although the pressed out turn-preventing shoulders 39 afford at the locations thereof openings or recesses that may serve as such indicia, locatable from the outer side of the cover although substantially concealed from view behind the cover portion 25 unless one especially looks for the location of the pressed out turn-preventing shoulders.

In the modification of Figures 7-9, a cover 60 is provided which in certain respects embodies a combination of cover retaining features of the covers 15 and 40 of Figs. 2 and 3, respectively. The cover 60 is constructed and arranged for disposition at the outer side of a vehicle wheel including a disk spider wheel body 61 supporting a drop center, multi-flanged tire rim 62. A generally axially outwardly facing outer side flange 63 of the tire rim merges with a generally axially outwardly extending and radially outwardly inclined intermediate flange 64 leading into a terminal flange 65. A pneumatic tire 67 is supported by the tire rim, and a valve stem 68 is provided for inflation of the tire.

At equidistantly circumferentially spaced points the axially outer portion of the intermediate flange 64 is provided with generally radially inwardly projecting protuberances or bumps 69, which may be three or four in number and having axially outer side lead-in cam surfaces 70 and generally undercut axially and radially inwardly facing cam retaining shoulders 71.

The cover 60 which may be economically manufactured on a mass production basis as a stamped or drawn circular member from suitable sheet metal such as stainless steel blanks or strip, or suitable grade of brass or aluminum, includes a suitably ornamental crown or central portion 72, an inwardly dished intermediate annular portion 73 of generally curved configuration and a generally axially outwardly extending outer terminal or marginal portion 74 having a rolled or beaded underturned reinforcing and finishing edge portion 75. This underturned beaded edge 75 is adapted to seat or bottom on the rim terminal flange 65 when the cover is on the wheel. Optionally, however, the cover may instead have the dished portion 73 bottom on the side flange 63 of the tire rim 62 adjacent juncture with the body part 61.

It will be observed that the intermediate annular portion 73 of the cover curves generally radially and axially outwardly toward juncture with the axially extending marginal cover portion 74 which is of a diameter less than the diameter of the axially outer portion of the intermediate flange 64, but of greater diameter than the common diameter about the tips of the retaining bumps 69.

Moreover, for resilient press-on, pry-off retaining engagement with the retaining bumps 69, there is provided adjacent junction of the cover portions 73 and 74, an annular rib or shoulder 77 projecting generally radially outwardly. The periphery of this rib or shoulder 77 is normally in a circle of a diameter somewhat greater than the diameter of the circle common to the innermost surfaces or noses of the bumps 69. It will be observed that the shoulder or rib 77 is provided by an angular generally radially extending narrow, preferably radially and axially outwardly oblique offsetting flange 78 between the cover portions 73 and 74.

In order for the shoulder 77 to pass over the bumps 69 (Fig. 9) in the application of the cover to the wheel, the shoulder must yield resiliently. This is made possible by the resilient characteristics of the material of the cover in addition to the arrangement and location of the shoulder 77 with reference to the bumps 69.

The shoulder or rib 77 is disposed at the axially inner side of and leads into a plurality of circumferentially spaced recesses, indentations, sockets or pockets 79 embossed or pressed radially inwardly in the annular cover portion 74 immediately adjacent to the shoulder 77 and defined at their axially inner sides by such shoulder. The pockets 79 may be of greater number than the bumps 69 but so disposed with respect to a valve stem opening 80 in the intermediate cover portion 73 that a number of the pockets corresponding to the bumps 69 on the wheel will be axially aligned with the bumps when the valve stem 68 is inserted through the hole 80. Hence, continued inward movement of the cover 60 on the wheel will result in the socketing or projection of the retaining bumps within the pockets.

It will be appreciated that in applying the cover 60 to the wheel substantially the same resilient, flexing, elastic action and reaction of the shoulder 77 and the outer marginal portion of the cover will result as described in connection with the cover 15 with particular reference to Figs. 4, 5 and 6. The offsetting flange 78 serves as a lead-in or cam surface that engages the lead-in surfaces 70 of the retaining bumps and in response to continued inward pushing of the cover onto the wheel effects radially inward deflection of the shoulder 77 which is common to all of the pocket indentations 79 as shown on comparison of the full line and dash outline positions of the cover in Fig. 9. Upon passing of the shoulder 77 axially inwardly onto the retaining shoulders 71 of the retaining bumps the cover snaps home to seat the edge bead 75 against the tire rim, and with the bumps 69 accommodated in freely cleared relation within the recesses of the pockets 79. The distance between the shoulder 70 and the bead 75 is such as to maintain the shoulder under resilient tensioned gripping radially outward thrusting engagement with the bump shoulders 71.

When the bumps 69 are disposed in the indentations or pockets 79, they are not only resiliently gripped by the cover for detachably retaining the cover on the wheel, but also are opposed by the circumferentially spaced sides of the pockets 79 for preventing relative rotation of the cover and the wheel.

The indentations or pockets 79, as will be noted from Fig. 1, are arranged in a common circle and although in excess of the actual number of bumps 69 serve to ornament the cover. For illustration, if the cover has a highly lustrous finish the embossed indentations 79 can be painted in color so as to stand out in contrast to the luster of the cover.

Removal of the cover 60 may be effected readily by insertion of a pry-off tool behind the turned bead 75 and application of pry-off force to resiliently yieldably release the cover from the retaining bumps 69.

In Figure 10 there is illustrated a modification of the invention wherein a cover 60' insofar as its retaining feature is concerned is identical with the cover 60. To the extent that there is identity not only of the covers 60 and 61 but also the features of the wheel, identical reference numerals have been applied in Fig. 10 and the same description will be understood to apply.

The cover 60' differs from the cover 60, however, in that the cover 60' is in the form of a trim member or ring instead of in the form of a full disk. Its radially outer portion cooperates with the tire rim 62 but its radially inner portion terminates in an annular turned edge 81 which overlaps and is bottomed on a central sheet metal hub cap 82. A resilient peripheral bead edge 83 on the hub cap is detachably engageable in snap-on, pry-off relation with shoulder means or bumps 84 on the wheel body part 61.

In the form of the invention in Fig. 10, the hub cap 82 is first applied to the wheel. Then the cover or trim member 60' is pressed into retaining cooperation with the retaining bumps 69 on the tire rim 12 in the same manner as the cover 60 is applied. However, in this instance, the cover 60' has the inner turned edge 81 thereof yieldably bottomed on and in overlapping relation with the hub cap 82. This arrangement enables a very pleasing ornamental effect to be obtained by virtue of the contrast of the ring cover member 60' against the hub cap 82.

The present application is a continuation-in-part of my application Serial No. 499,666 filed April 6, 1955, now abandoned.

It will be understood that modifications and variations may be effected without departing from the scope of the novel concepts of the present invention.

I claim as my invention:

1. In a wheel structure, a wheel including tire rim and body parts one of which has generally radially extending spaced protuberances disposed generally in a common circle about the axis of the wheel, and a metallic circular cover member having an outer marginal annular edge portion merging into a dished curved inner portion with an annular shoulder at the junction of said portions, said outer portion having offset structure providing recesses on the axially outer side of the cover adapted to register with said wheel protuberances, and each recess being defined on one of its sides by said shoulder, said shoulder being common to all said recesses and being resiliently deflectable radially when pressed against said wheel protuberances for entry of said protuberances in recesses to retain the cover on the wheel and against turning.

2. In a wheel structure, a wheel including tire rim and body parts one of which has generally radially extending spaced protuberances disposed generally in a common circle about the axis of the wheel, and a metallic circular cover member having an outer marginal annular edge portion merging into a dished curved inner portion with an annular shoulder at the junction of said portions, said outer portion having offset structure providing recesses on the axially outer side of the cover and each recess being defined on its inner side by said shoulder, said shoulder being continuous and common to all said recesses and being resiliently deflectable radially when pressed against said wheel protuberances for entry of said protuberances in recesses to retain the cover on the wheel and against turning.

3. In a wheel structure, a wheel including tire rim and body parts one of which has generally radially extending spaced protuberances disposed generally in a common circle about the axis of the wheel, and a metallic circular cover member having an outer marginal annular edge portion merging into a dished curved inner portion with an annular shoulder at the junction of said portions, said outer portion having offset structure providing recesses on the axially outer side of the cover, and each recess being defined on one of its sides by said shoulder, said shoulder being common to all said recesses and being resiliently deflectable radially when pressed against said wheel protuberances for entry of said protuberances in recesses to retain the cover on the wheel and against turning, said recesses comprising embossed indentations resiliently yieldable in unison with said shoulder.

4. In a wheel structure, a wheel including tire rim and body parts one of which has generally radially extending spaced protuberances disposed generally in a common circle about the axis of the wheel, and a metallic circular cover member having an outer marginal annular edge portion merging into a dished curved inner portion with an annular shoulder at the junction of said portions, said outer portion having offset structure providing recesses on the axially outer side of the cover, at least some of which are adapted to register with said wheel protuberances, and each recess being defined on one of its sides by said shoulder, said recesses comprising indentations outwardly of said shoulder and said shoulder comprising a resilient edge common to all said indentations and resiliently deflectable upon engagement with said protuberances into indentations to retain the cover on the wheel and against rotation.

5. In a wheel structure, a wheel including tire rim and body parts one of which has generally radially extending spaced protuberances disposed generally in a common circle about the axis of the wheel, and a metallic circular cover member having an outer marginal annular edge portion merging into a dished curved inner portion with an annular shoulder at the junction of said portions, said outer portion having offset structure providing recesses on the axially outer side of the cover and each recess being defined on one of its sides by said shoulder, said shoulder being common to all said recesses and being resiliently deflectable radially when pressed against said wheel protuberances for entry of said protuberances in recesses to retain the cover on the wheel and against turning, said shoulder comprising an edge for bottoming on the wheel axially inward and radially behind said protuberances.

6. In a wheel structure, a wheel including tire rim and body parts one of which has generally radially extending spaced protuberances disposed generally in a common circle about the axis of the wheel, and a metallic circular cover member having an outer marginal annular edge portion merging into a dished curved inner portion with an annular shoulder at the junction of said portions, said outer portion having offset structure providing recesses on the axially outer side of the cover and each recess being defined on one of its sides by said shoulder, said shoulder being common to all said recesses and being resiliently deflectable radially when pressed against said wheel protuberances for entry of said protuberances in recesses to retain the cover on the wheel and against turning, said recesses comprising sockets and said shoulder comprising a lead-in edge deflectably engaging the protuberances in advance of recesses being socketed on the protuberances.

7. In a wheel structure, a wheel including tire rim and body parts one of which has generally radially extending spaced protuberances disposed generally in a common circle about the axis of the wheel, and a metallic circular cover member having an outer marginal annular edge portion merging into a dished curved inner portion with an annular shoulder at the junction of said portions, said outer portion having offset structure providing recesses on the axially outer side of the cover and each recess being defined on one of its sides by said shoulder, said shoulder being common to all said recesses and being resiliently deflectable radially when pressed against said wheel protuberances for entry of said protuberances in recesses to retain the cover on the wheel and against turning, said recesses being in excess of the number of the protuberances but having spacing such that certain of them will always align with the protuberances.

8. In a wheel structure, a wheel including tire rim and body parts one of which has generally radially extending spaced protuberances disposed generally in a common circle about the axis of the wheel and having a valve stem, and a metallic circular cover member having an outer marginal annular edge portion merging into a dished curved inner portion with an annular shoulder at the junction of said portions, said outer portion having offset structure providing recesses on the axially outer side of the cover, and each recess being defined on one of its sides by said shoulder, said shoulder being common to all said recesses and being resiliently deflectable radially when pressed against said wheel protuberances for entry of said protuberances in recesses to retain the cover on the wheel and against turning, said cover having a hole to receive said valve stem so as to align at least certain of the recesses with protuberances on the wheel.

9. In a wheel structure, a wheel including tire rim and body parts one of which has generally radially extending spaced protuberances disposed generally in a common circle about the axis of the wheel, and a circular cover member having an outer marginal edge portion and an annular shoulder positioned generally radially inwardly of said edge portion, offset structure providing recesses on the axially outer side of the cover between said edge portion and said shoulder adapted to register with said wheel protuberances, and each recess being defined on one of its sides by said shoulder, said shoulder being common to all said recesses and being resiliently deflectable radially when pressed against said wheel protuberances for entry of said protuberances in recesses to retain the cover on the wheel and against turning.

10. In a wheel structure, a wheel including tire rim and body parts one of which has generally radially extending spaced protuberances disposed generally in a common circle about the axis of the wheel, and a circular cover member having an outer marginal edge portion and shoulder means positioned generally radially inwardly of said edge portion, offset structure providing recesses on the axially outer side of the cover between said edge portion and said shoulder means adapted to register with said wheel protuberances, and each recess being defined on one of its sides by said shoulder means, said shoulder means being disposed in a circle common to all said recesses and being resiliently deflectable radially when pressed against said wheel protuberances for entry of said protuberances in recesses to retain the cover on the wheel and against turning.

11. In a wheel structure, a wheel including tire rim and body parts one of which has a plurality of generally radially extending spaced protuberances disposed generally in a common circle about the axis of the wheel, and a metallic circular cover member having a marginal annular generally radially projecting outer edge portion leading into a generally axial portion of substantially greater width than the axial dimension of said protuberances and which merges into a dished curved radially inner portion, said axial portion having rib like shoulder means normally on a circle of a diameter so that the said shoulder means can fit under tension retainingly behind said protuberances, said axial portion being recessed in radially inward offset relation to said shoulder means for registration with said wheel protuberances, said recess being defined on its axially inner side by said shoulder means and said shoulder means being resiliently deflectable radially inward out of said circle at said protuberances when pressed against said wheel protuberances for entry of said protuberances in said recess and resilient gripping engagement of said shoulder means behind said protuberances to retain the cover member on the wheel, said axial portion having shoulders thereon provided by pressing deformation thereof so that the shoulders are disposed for opposing certain sides of one or more of the protuberances to hold the cover against turning.

12. In a wheel structure, a wheel including tire rim and body parts one of which has a plurality of generally radially extending spaced protuberances disposed generally in a common circle about the axis of the wheel, and a metallic circular cover member having a marginal annular generally radially projecting edge portion leading into a generally axial portion of substantially greater width than the axial dimension of said protuberances and which merges into a dished curved inner portion, with radial rib-like shoulder means in the axially inner part of said axial portion and normally on a circle of a diameter to fit retainingly behind said protuberances, said axial portion being recessed in offset relation to said shoulder means on the axially outer side of the cover member for registration with said wheel protuberances, said recess being defined on its axially inner side by said shoulder means, said shoulder means being resiliently deflectable radially when pressed against said wheel protuberances for entry of said protuberances in said recess and resilient gripping engagement of said shoulder means behind said protuberances to retain the cover member on the wheel, said outer and inner cover portions extending in opposite radial directions from said axial portion and enhancing the resilience of the same for mutual resilient cover retaining coaction with said shoulder means, said recess having circumferentially directed shoulder means provided by offseting of the material of said axial portion and engageable with circumferentially facing protuberance sides for retaining the cover member against turning.

13. In a cover for disposition at the outer side of a vehicle wheel having spaced protuberances for retaining engagement with the cover, the cover including a generally axially inset portion and a generally radially extending annular portion spaced axially outwardly and joined to the inset portion by a generally axially extending circular cover portion shouldered adjacent to juncture with the inset cover portion for retaining engagement behind the protuberances on the wheel and toward which shoulder a flange part emanating from said inset cover portion extends generally axially outwardly and radially for imparting resilient thrusting protuberance engaging grip to the shoulder, said generally axially extending cover portion being recessed radially away from the shoulder for clearing the protuberances and having circumferentially offset oppositely circumferentially facing spaced shoulders formed integrally thereon for engageable opposition respectively with protuberance sides to hold the cover against turning on the wheel.

14. In a cover for disposition at the outer side of a vehicle wheel having spaced protuberances for retaining engagement with the cover, the cover including a generally axially inset portion and a generally radially extending annular portion spaced axially outwardly and joined to the inset portion by a generally axially extending circular cover portion having adjacent to juncture with the inset cover portion a shoulder for retaining engagement behind the protuberances on the wheel and toward which shoulder a flange part emanating from said inset cover portion extends generally axially outwardly and radially for imparting resilient thrusting protuberance engaging grip to said shoulder, said generally axially extending cover portion being recessed radially away from said shoulder for clearing the protuberances, said flange part and said generally axially extending cover portion joining continuously and the recessing of said axially extending cover portion comprising individual circumferentially spaced sockets in said axially extending cover portion.

15. In a cover for disposition at the outer side of a vehicle wheel having spaced protuberances for retaining engagement with the cover, the cover including a generally axially inset portion and a generally radially extending annular portion spaced axially outwardly and joined to the inset portion by a generally axially extending circular cover portion having adjacent to juncture with the inset cover portion a shoulder for retaining engagement behind the protuberances on the wheel and toward which shoulder a flange part emanating from said inset cover portion extends generally axially outwardly and radially for imparting resilient thrusting protuberance engaging grip to said shoulder, said generally axially extending cover portion being recessed radially away from said shoulder for clearing the protuberances, said flange part offsetting said generally axially extending cover portion relative to the adjacent juncture of the inset cover portion.

16. In a wheel structure including a tire rim having an annular radially inwardly facing flange provided with circumferentially spaced generally radially inwardly projecting cover retaining protuberances affording generally axially and radially inwardly facing cover retaining shoulders, a cover member for disposition at the outer side of the wheel including a portion for bottoming against the wheel to determine the axially inward disposition thereof and a continuous circular portion for generally telescoping disposition within said rim flange, said telescoping cover portion being of a diameter greater than the radially inward projection of said protuberances but less than the diameter of said rim flange adjacent to said protuberances and between the protuberances, said telescoping cover portion being radially resiliently deflectable and having retaining shoulder means thereon retainingly engageable with the protuberance shoulders by pressing the portions of the circular cover portion axially inwardly from the shoulder means over and past the protuberances for thereby radially inwardly deflecting such axially inward portions and the shoulder means with corresponding radially outward deflection of the portions of said circular cover portion intermediate the retaining protuberances and then radially inward flexible returning of such intermediate portions after the circular cover portion shoulder means have passed behind the protuberance shoulders, said bottoming portion of the cover member retaining the cover member in position wherein said cover member shoulder means remain under slightly radially inwardly tensioned engagement with the protuberance shoulders and said intermediate cover portions remaining under slight radially outwardly deflected tension but spaced from the rim flange, whereby a firm rattle-proof retaining interengagement of the cover member and the wheel is attained.

17. The structure of claim 16 wherein said shoulder means of the cover member is provided with struck out turn-preventing shoulder tabs providing shoulders that face generally circumferentially and are engageable with sides of protuberances to hold the cover member against turning.

18. In a wheel structure including a wheel member having a generally radially facing annular flange with a series of circumferentially spaced cover retaining protuberances thereon, a cover for disposition at the outer side of the wheel including radially inner and outer circular portions with an annular intermediate resilient portion connecting said radially inner and outer cover portions and extending generally axially and facing generally radially for opposition to said wheel flange, said intermediate cover portion being provided with a plurality of sockets for reception of said retaining bumps and having axially inner shoulder means retainingly engageable with the axially inner sides of said protuberances and generally circumferentially facing sides opposing the sides of the retaining protuberances for holding the cover against turning.

19. In a wheel structure, a wheel including tire rim and body parts one of which has generally radially extending spaced protuberances disposed generally in a common circle about the axis of the wheel, and a circular cover member having an outer marginal edge portion and shoulder means positioned generally radially inwardly of said edge portion, offset structure providing recesses on the axially outer side of the cover between said edge portion and said shoulder means adapted to register with said wheel protuberances, and each recess being defined on one of its sides by said shoulder means, said shoulder means being disposed in a circle, common to all said recesses and against said wheel protuberances for entry of said protuberances in said recesses to retain the cover on the wheel against turning.

20. In a wheel structure, a wheel including tire rim and body parts one of which has generally radially extending spaced protuberances disposed generally in a common circle about the axis of the wheel, and a circular cover member including an annular dished area and having an outer marginal edge portion and shoulder means positioned generally radially inwardly of said edge portion on said annular dished area, recessed areas defining radially opening recesses on the axially outer side of the cover between said edge portion and said shoulder means for receipt of said protuberances adapted to register with said wheel protuberances, and each recess being defined on one of its sides by said shoulder means, said recesses comprising indentations outwardly of said shoulder means and said shoulder means comprising resilient edges disposed in a circle common to all said indentations and resiliently deflectable upon engagement with said protuberances to afford entry of the protuberances into indentations to retain the cover on the wheel and against rotation.

References Cited in the file of this patent

UNITED STATES PATENTS

| | | |
|---|---|---|
| 2,102,471 | Lyon | Dec. 14, 1937 |
| 2,326,788 | Lyon | Aug. 17, 1943 |
| 2,624,640 | Lyon | Jan. 6, 1953 |